March 25, 1969 E. R. GEIS 3,435,248

A-C VOLTAGE REGULATOR

Filed Dec. 27, 1966 Sheet 1 of 2

Inventor
Everett R. Geis

By James J. Jennings, Jr.
Attorney

Inventor
Everett R. Geis

By James J. Jennings, Jr.
Attorney

United States Patent Office 3,435,248
Patented Mar. 25, 1969

3,435,248
A-C VOLTAGE REGULATOR
Everett R. Geis, Orange, Calif., assignor to Borg-Warner Corporation, Chicago, Ill., a corporation of Illinois
Filed Dec. 27, 1966, Ser. No. 604,937
Int. Cl. H02j 3/32
U.S. Cl. 307—46       6 Claims

ABSTRACT OF THE DISCLOSURE

An A-C voltage regulator includes a first inductor connected between an inverter and an A-C output line, and a capacitor connected between the A-C output line and ground. The capacitor and inductor have approximately the same impedance magnitude at the A-C operating frequency. A second inductor has one end connected to the A-C output line and the other end connected, through a pair of oppositely connected SCR's, to ground. A signal related to the amplitude of the A-C output voltage regulates the conduction times of the SCR's to place the second inductor in the circuit on a time-sharing basis, thus modifying the composite tuning characteristic of the first and second inductors and the capacitor. The complete non-interruptible power supply system includes a regulator, as jet described and: a battery, coupled to the input side of the inverter; a charger, coupled between an A-C supply line and the input side of the inverter; a primary energization path, including a third inductor coupled between the A-C supply line and the A-C output line; and a synchronizing unit, connected to receive input signals from the A-C supply line and the A-C output line, and to apply a synchronizing signal to the inverter.

BACKGROUND OF THE INVENTION

This invention is directed to amplitude regulation of an A-C output voltage from an inverter, and more particularly to the use of a reactive network, coupled to the output side of the inverter, which has a certain response at the inverter output frequency; this response is altered by varying the effective impedance of one network component on a time-sharing basis to maintain the output A-C voltage at a desired level.

There is a continuing need for voltage regulation when an inverter supplies an A-C voltage for passage over an output line to a load. The amplitude of the A-C voltage on the output line can suddenly increase due to a fluctuation in the load conditions, or it may decrease if there is a decrease in the level of the D-C input voltage utilized to energize the inverter. Various approaches have been taken to provide some measure of regulation of the inverter output voltage. Frequently a large transformer has been coupled to the output side of the inverter, for example as described and claimed in Patent No. 3,219,919, Schmidt, which is assigned to the assignee of this invention. That patent represented a significant step forward in the art, but still required the large transformer, the capacitor coupled across each of the transformer secondary windings and a saturable reactor which was parallel-coupled with the capacitor. Another use of a transformer to provide an A-C signal indicative of the inverter output voltage is shown in Patent No. 3,223,922, Borden, which is also assigned to the assignee of this invention. However it was desired to provide an expeditious, simple and inexpensive arrangement in which the voltage regulating arrangement could be directly connected to the output A-C line and thus obviate the large components conventionally used and shown in those patents, and this was the salient consideration in the development of the present invention.

Another problem prevalent in this art has been the lack of adequate, positive-acting protective equipment for providing a well regulated A-C output voltage but which will not be disturbed by a short thrown on the output line, a protection not available with known equipment. This consideration was also a significant factor in the development of the present invention.

Frequently a system is provided in which a commercial A-C line is utilized to energize a load, and a stand-by or alternative path is provided for energizing an inverter to pick up the load and commence energizing the load immediately if there is an outage on the A-C supply circuit. Another consideration in the present invention has therefore been the provision of such an arrangement, both inexpensive and compact, in which the inverter can pick up the load virtually instantaneously and in the proper phase synchronism if there is either a failure of the A-C supply source or a short placed somewhere in the primary energization path from the A-C supply line to the load.

SUMMARY OF THE INVENTION

In answer to the rather stringent demands outlined above, the A-C voltage regulating arrangement of the present invention was developed to control the amplitude of an A-C voltage passed over an output line to energize a load, and particularly in such systems in which an inverter is connected to produce the A-C voltage output for passage over the output line. In a preferred embodiment the invention includes a filter, which has a first inductor coupled between the inverter and the A-C output line, and a capacitor coupled between the A-C output line and ground. The inductor and the capacitor exhibit substantially the same impedance magnitude at the frequency of the inverter output voltage. Also provided is a regulator, which includes a second inductor having one end connected to the A-C output line. A first polarized switch, which may be a silicon-controlled-rectifier (SCR), is coupled in a given sense between the other end of the second inductor and ground. A second polarized switch is coupled in the opposite sense between the other end of the second inductor and ground, so that closure of the first switch completes a path for current flow in a first direction through the second inductor during at least a portion of the A-C cycle when the instantaneous output voltage is of a given polarity (for example, positive), and closure of the second polarized switch is effective to complete a path for current flow in the opposite direction through the second inductor during at least a portion of the A-C cycle when the instantaneous output voltage is of the opposite polarity (negative). These connections of the polarized switches provide a time-sharing connection of the second inductor which, with the filter, thus provides a composite tuning characteristic. A regulator control unit is connected to the A-C output line to sense the amplitude of the output A-C voltage passed from the filter toward the load, and the control unit is also connected to the regulator itself. In response to a deviation in a first direction in the amplitude of the output A-C voltage (for example, a voltage level increase), the regulator control unit operates to modify the closure times of the polarized switches in a first sense to modify the composite tuning characteristic in a first direction, and likewise the control unit operates in response to a deviation in a second direction opposite the first direction in the amplitude of the output A-C voltage (for example, a voltage amplitude decrease) to modify the closure times of the polarized switches in the opposite sense, thus to modify the composite tuning characteristic in the opposite direction and thereby regulate the amplitude of the output A-C voltage which is passed to the load.

THE DRAWINGS

Like reference numerals identify like elements in the several figures of the accompanying drawings, in which.

DETAILED DESCRIPTION OF THE INVENTION

Figure 1:
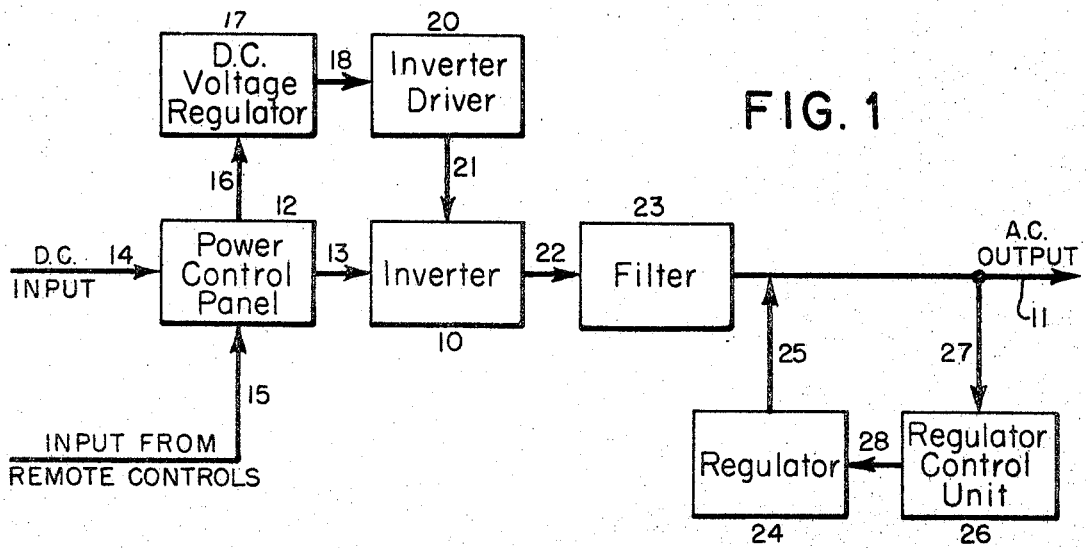
FIGURE 1 is a block diagram illustrating generally the inventive arrangement.

Block arrangement: FIGURE 1

The invention finds particular utility in regulating the output voltage provided by an inverter 10 and passed over an A-C output line 11 to a suitable load, such as a motor (not shown). The inverter can be energized from power supplied by a power control panel 12 over a D-C energization line 13. In its turn the power control panel receives D-C input energy over input line 14 from a battery (not shown), or other suitable source, and also receives regulating signals over the remote control line 15. Energy is passed from control panel 12 over line 16 to supply D-C voltage over line 18 to energize inverter driver unit 20. In a well known manner driver 20 applies signals over line 21 to regulate operation of the inverter, thereby controlling the times at which the SCR's or other switches in the inverter are closed, to provide the appropriate frequency and voltage level of the A-C energy which appears on conductor 22.

The present invention includes a filter 23, coupled between line 22 from the inverter and the output A-C line 11. A regulator 24 is coupled over line 25 directly to the A-C output line 11, and regulator 24 includes the second inductor (not shown) connected in a time-sharing basis as described generally above. Also coupled directly to the A-C output line 11 over another line 27 is a regulator control unit 26, which is operative to sense the amplitude of the A-C output voltage appearing on line 11. As the voltage level deviates from a predetermined amplitude, control signals are provided over line 28 to regulate the operation of the regulator 24 and modify the composite tuning characteristic presented by filter 23 and regulator 24 to the A-C output voltage, thus to maintain substantially constant the level of the A-C voltage passed over line 11 toward the load.

Figure 2:
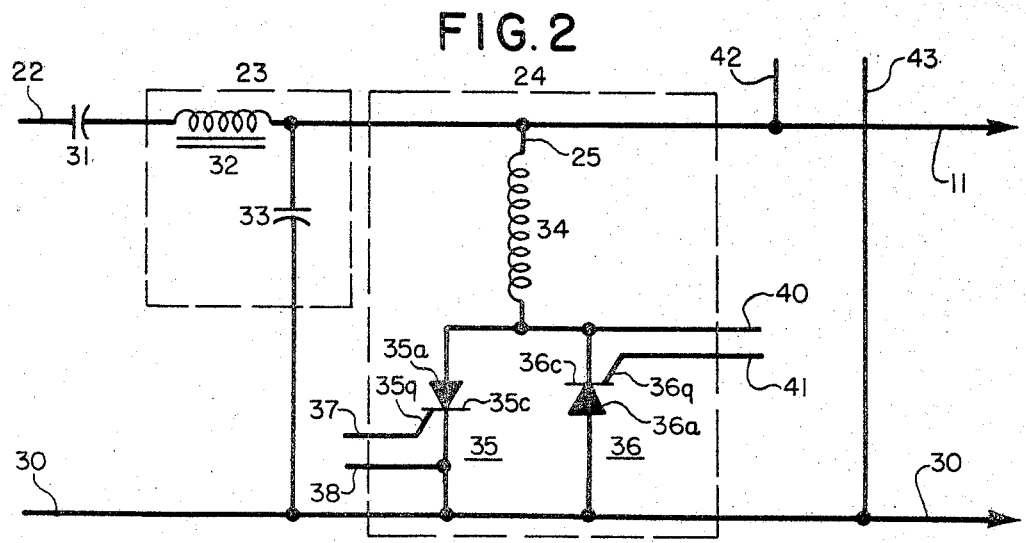
FIGURE 2 is a partial schematic diagram, depicting in more detail certain of the components represented in block form in FIGURE 1.

Filter and regulator circuit: FIGURE 2

As there shown, a reference or ground conductor 30 is provided for cooperation with the inverter output conductor 22 and the A-C output conductor 11 in the translation of the A-C energy. Those skilled in the art will appreciate that this reference conductor is omitted in the block and line showing of FIGURE 1, wherein only the flow of energy and signal information is depicted.

A capacitor 31 is coupled between inverter output conductor 22 and a first inductor 32, one of the two principal components of the filter 23. The other filter component is a capacitor 33 which is coupled between A-C output line 11 and ground conductor 30. Inductor 32 provides short circuit protection for the source feeding conductor 22, in the event output lines 11 and 30 ever become connected. This advantage is of particular utility when the load to be supplied from the inverter is an A-C motor, which may have a starting current 15 or 20 times the rated current.

In regulator 24, a second inductor 34 has one end coupled to the A-C output line 11, and the other end coupled to a pair of oppositely-connected polarized switches 35, 36. In a preferred embodiment SCR's were utilized as the polarized switches. SCR 35 includes an anode 35a, a cathode 35c, and a gate or control element 35g. Similar notation is used to identify the anode, cathode and gate of SCR 36. A pair of conductors 37, 38 are respectively connected between gate 35g and cathode 35c of SCR 35, and conductors 40, 41 are similarly connected to the cathode 36c and gate 36g of SCR 36. Suitable gating signals are applied over these four conductors to control the conduction and non-conduction of the polarized switches, in a manner represented generally by the single line 28 in FIGURE 1.

The single line 27 of FIGURE 1, representing the sensing of the A-C output voltage by the regulator control unit 26, is depicted in the schematic illustration of FIGURE 2 by the two conductors 42, 43 which are respectively connected to A-C output line 11 and ground conductor 30. Accordingly the amplitude of the output voltage passed toward the load is also represented by the amplitude of the signal appearing between conductors 42, 43.

Figure 3:
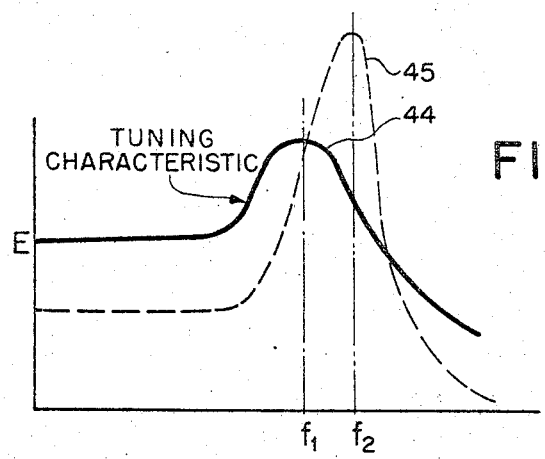
FIGURE 3 is an illustrative graphical representation useful in understanding the operation of the invention.

In operation, the square wave signal passed from the output side of inverter 10 is applied, through capacitor 31, to the filter 23 and because of the reactive components in this circuit, a substantially sinusoidal A-C output wave is provided. With the electrical characteristics of inductor 32 and capacitor 33 selected to provide substantially the same impedance magnitude at the output frequency of inverter 10, a tuning characteristic or frequency response curve analogous to that depicted by the solid line 44 in FIGURE 3 is provided. As a practical matter this curve 44 is a composite characteristic which includes the value of inductance represented by the effective value of inductor 34 in the regulator 24, determined by that portion of each cycle in which the second inductor 34 is coupled (by conduction of the SCR's 35, 36) in the circuit between output A-C line 11 and ground conductor 30.

Considering that the composite tuning characteristic is normally that indicated by the solid line 44 in FIGURE 3, if the load requirements momentarily diminish and the load voltage tends to increase, the SCR's 35, 36 are fired earlier in each half-cycle of operation. This decreases the effective inductance of the filter-regulator arrangement and shifts the composite tuning characteristic to the position indicated by the broken line 45. Similarly if the load voltage tends to decrease, or likewise if changes in the level of the voltage supplied to the input side of the inverter occur, the output voltage is automatically sensed and compensated by the action of regulator control unit 36 and regulator 24 to modify the composite tuning characteristic of the filter and the regulator, and stabilize the A-C voltage passed over output line 11 to the load. Only negligible actual power is wasted or consumed in the filter and regulator, which are comprised of essentially reactive components.

Figure 4:
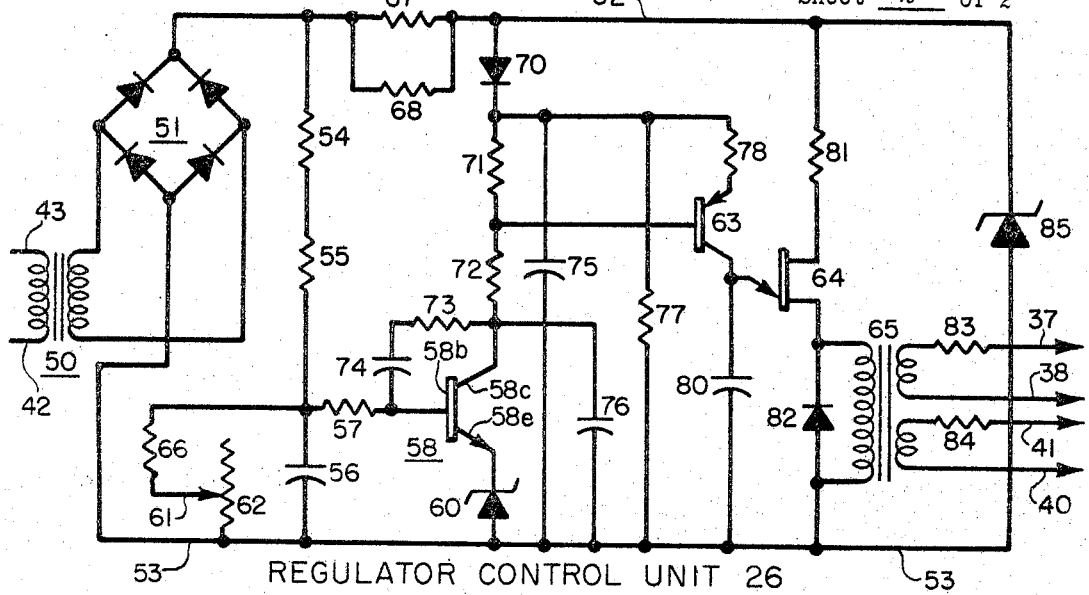
FIGURE 4 is a partial schematic diagram of another component depicted in block form in FIGURE 1.

Regulator control unit 26: FIGURE 4

FIGURE 4 indicates the schematic details of regulator control unit 26, and its interconnection with the A-C output line 11 in the application of control and gating signals to regulator 24. As noted above the single line 27 of FIGURE 1 is represented in more detail by the input conductors 42, 43 in FIGURE 2, and the same is true in FIGURE 4. The single line 28 of FIGURE 1 actually represents the four conductors 37, 38, 40 and 41 in FIGURES 2 and 4. The similarly referenced conductors in FIGURES 2 and 4 indicate the appropriate interconnection of the regulator with the regulator control unit.

In operation of the circuit shown in FIGURE 4, the A-C signal appearing between conductor 42, 43 is applied over a transformer 50 to a rectifier bridge 51, and the resultant D-C output signal from the bridge is applied between conductors 52, 53 of the regulator control unit 26. The resultant D-C signal is applied across a voltage divider circuit including resistors 54, 55, 66, and the effective portion of potentiometer 62. A capacitor 56 is coupled across resistor 66 and potentiometer 62. The signal, or rather the voltage level between resistor 55 and capacitor 56, is applied through base protection resistor 57 to the base 58b of a transistor 58, the emitter 58e of which is coupled through a Zener diode 60 to conductor 53. In that the Zener diode 60 provides a certain reference voltage level, it is apparent that the precise level of conduction of transistor 58 is a function of the D-C voltage appearing between conductors 52, 53. An adjustment of the reference voltage against which the output A-C voltage can be compared is effected by the positioning of arm 61 of potentiometer 62, thus to modify the distribution of the voltage divider circuit regulating the conduction level of transistor 58.

The conduction of transistor 58 in turn regulates conduction of transistor 63, and the time of operation of the unijunction transistor 64, thus to regulate the passage of the SCR gating signals over transformer 65 and the respective conductors 37, 38, 40 and 41 to the polarized switches 35, 36 in the regulator 24. The interconnection and operation of the various circuit components will be apparent to those skilled in the art. Further to assist those skilled in this art to practice the invention with a minimum of experimenation, and is no sense by way of limitation, a table of component identifications and values will be set out at the end of the specification.

Figure 5:
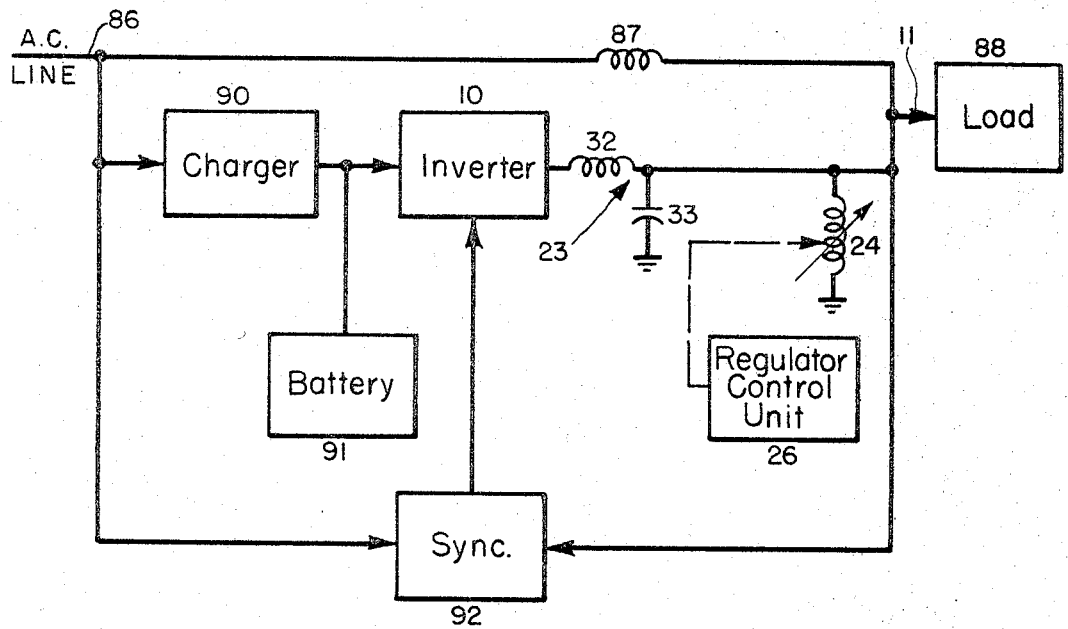
FIGURE 5 is a block diagram, partly in schematic form, depicting the incorporation of the invention in a general power supply system arrangement.

Parallel energization system of FIGURE 5

In the showing of FIGURE 5, the time-sharing inductor 34 is represented without the polarized switches 35, 36 as previously described, but it will be understood that the provision and operation of the time-sharing inductor is precisely as illustrated and described in conjunction with the previous figures. A-C energy provided from an input line 86 is passed over a series-coupled inductor 87 and output A-C line 11 to the load 88. An alternate energization path is provided from the input A-C line 86 over the charger 90 (which may include a rectifying arrangement in a well-known manner), inverter 10, filter 23 and regulator 24 to the A-C output line 11. A synchronizing unit 92 is provided and connected to sense the phase of the A-C output signal on line 11, and apply a signal to inverter 10 to synchronize inverter operation so that the inverter output voltage is in phase with the A-C output voltage on line 11. This connection insures that, should a short circuit occur in the primary energization path including series-coupled inductor 87, the inverter will not only pick up the A-C load instantaneously, without switching of any kind, but will also come on the line precisely in phase with the energy that was being passed to the load over the direct circuit including inductor 87. The other connection to sync unit 92 from the A-C input line 86 is made to effectively disable the sync unit if there is a failure of power on the A-C input line 86, so that after the inverter picks up the load in phase, it is allowed to run free without any regulation from the sync unit.

In the circuit of FIGURE 5, the A-C energy applied to the input side of charger 90 is rectified and utilized to charge battery 91 so that energy from the inverter 10 is always available in the event of a failure of the primary power feeding line. In addition, if the load voltage becomes higher than the output voltage of the inverter, energy is "pumped" backward through the inverter into the battery so that the charger is assisted in performing its primary function. This backward pumping of energy is made possible by the conventional connection of "spillover" diodes in the inverter phase circuits; the connection and operation of such diodes is now well known and understood in this art. Conversely, if the voltage level on the output A-C line 11 should dip, the inverter which is operating precisely in phase with the output voltage commences to feed energy over the filter 23 and regulator 24 and makes up the difference to effect regulation of the output voltage.

It is noted that by reason of the connection of capacitor 33 to that side of inductor 32 which is nearer output A-C line 11, the capacitor 33 cooperates with inductor 87 to, in effect, form a filter when the primary energization line is feeding the A-C energy to the load. Thus the regulator is effective whether the load is being supplied from the primary A-C line 86 over conductor 87, or from the output side of inverter 10. Likewise the filter is operative to remove "hash" or noise on the power line and on the output side of the inverter. Short circuit protection for A-C line 86 is effected by this arrangement wherein automatic transfer to the inverter occurs because it is always connected in the circuit and operating at no load. A primary advantage of the present invention is the protection against short circuits in the A-C power line 86. If, referring to FIGURE 5, a short were placed across the input conductor 86 and ground, the system shown in FIGURE 5 will keep on operating with the output of inverter 10 feeding the reactive components of filter 23 and regulator 24. Inductor 87 provides isolation from the short circuit.

Component identification

In one embodiment built and tested, inverter 10 (FIG. 1) was energized from a 240 volt D-C line, and the inverter output voltage was a square wave with a nominal amplitude of 120 volts. This was transformed up to 230 volts, under full load of 3.5 k.v.a., by filter 23, which also held the total distortion of the output voltage to less than 5%. The components of FIGURES 2 and 4 are identified as follows:

| Component: | Identification |
|---|---|
| 35 | G.E. C50. |
| 36 | G.E. C50. |
| 51 | 1N4005 (4 such). |
| 58, 60 | RA-2. |
| 63 | 2N3638. |
| 64 | 2N2646. |
| 70 | 1N4005. |
| 82 | 1N914. |
| 85 | 1N3799A. |
| 32 | 12.8 millihenries. |
| 34 | 19.6 millihenries. |
| 33 | 600 microfarads, 370 volts. |
| 56 | 10 microfarads, 25 volts D-C. |
| 74 | 47 microfarads, 50 volts D-C. |
| 75 | 47 microfarads, 50 volts D-C. |
| 76 | 47 microfarads, 50 volts D-C. |
| 80 | 18 microfarads, 100 volts D-C. |
| 54 | 18 kilohms, 5 watts. |
| 55 | 2.2 kilohms. |
| 57 | 2.2 kilohms. |
| 62 | 2.0 kilohms. |
| 66 | 1 kilohm, 5 watts. |
| 67 | 5 kilohms, 5 watts. |
| 68 | 5 kilohms, 5 watts. |
| 71 | 820 ohms. |
| 72 | 4.7 kilohms. |
| 73 | 560 ohms. |
| 77 | 6.8 kilohms. |
| 78 | 680 ohms. |
| 81 | 330 ohms. |
| 83 | 15 ohms. |
| 84 | 15 ohms. |

While particular embodiments of the invention have been shown and described, it will be apparent to those skilled in the art that various changes and modifications may be made therein without departing from the invention in its broader aspects. Therefore the aim in the appended claims is to cover all such changes and modifications as may fall within the true spirit and scope of the invention.

What is claimed is:
1. An A-C voltage regulating arrangement for controlling the amplitude of an A-C voltage produced by an inverter and passed over an output line to energize a load, comprising:
- a filter, including a first inductor coupled between the inverter and said output line, and a capacitor coupled between said output line and ground;
- a regulator connected between said output line and ground, comprising a second inductor, a first polarized switch coupled in a given sense to one end of said second inductor, and a second polarized switch coupled in a sense opposite said given sense to said one end of said second inductor, closure of said first switch being effective to complete a path for current flow through said second inductor during at least a portion of the A-C cycle when the instantaneous output voltage is of a given polarity and closure of said second switch being effective to complete a path for current flow through said second inductor during at least a portion of the A-C cycle when the instantaneous output voltage is of a polarity opposite said given polarity, thus effecting a time-sharing connection of said second inductor to provide, with said filter, a composite tuning characteristic; and
- a regulator control unit, connected to said output line to sense the amplitude of the output A-C voltage passed from said filter toward the load, and also connected to said regulator, operative in response to a deviation in a first direction in the amplitude of the output A-C voltage to modify the closure times of said switches in a first sense to shift said tuning characteristic in a first direction and operative in response to a deviation in a second direction opposite said first direction in the amplitude of the output A-C voltage to modify the closure times of said switches in a second sense opposite said first sense to shift said tuning characteristic in a second direction opposite said first direction, thus to regulate the amplitude of the output A-C voltage.

2. An A-C voltage regulating arrangement as claimed in claim 1 in which the impedance magnitude of said first inductor is substantially equal to the impedance magnitude of said capacitor at the frequency of the A-C voltage produced by the inverter.

3. An A-C voltage regulating arrangement as claimed in claim 1 in which said second inductor is connected directly to said output line, and said polarized switches are connected between said second inductor and ground.

4. A non-interruptible power supply system capable of withstanding A-C line failures in the form of short circuits, open circuits, and low supply voltage, including an A-C output line for supplying a load and an A-C input circuit, comprising:
- a charger coupled to said input circuit, operative to receive A-C input voltage and provide a D-C output voltage;
- an inverter connected for energization by the D-C output voltage of said charger to produce an A-C output voltage;
- a battery coupled to said inverter to energize the inverter upon failure of the D-C energy supplied by the charger;
- a filter, comprising a first inductor coupled in series between said inverter and the A-C output line, and a capacitor coupled between said A-C output line and ground;
- a regulator comprising a second inductor having one end coupled to said A-C output line and the other end coupled through a pair of oppositely connected polarized switches to ground;
- a regulator control unit, connected to the A-C output line and to said regulator, operative in response to a deviation in the amplitude of the output A-C voltage to modify the closure times of said switches in the appropriate sense to de-tune the filter-regulator combination and thereby regulate the amplitude of the A-C output voltage;
- a third inductor, coupled between said A-C input circuit and said A-C output line, electrically sized substantially the same as said first inductor to effectively cooperate with said capacitor as a filter circuit when no load current flows from the inverter through said first inductor and the load is supplied over said third inductor; and
- a sync unit, having input connections both from said A-C input circuit and said A-C output line, and an output connection to said inverter, operative to maintain the phase of the inverter output voltage in synchronism with the phase of the A-C output voltage passed over the A-C output line to the load.

5. An A-C voltage regulating system as claimed in claim 4 and in which closure of one of said polarized switches is effective to complete a path for current flow through said second inductor in a first direction during one portion of the alternation of the output voltage on said A-C output line, and closure of the other of said polarized switches is effective to complete a path for current flow through said second inductor in a second direction opposite said first direction during the other portion of the alternation of the output voltage appearing on said A-C output line.

6. An A-C voltage regulating system as claimed in claim 4 and in which the impedance magnitude of said first inductor is substantially equal to the impedance magnitude on said capacitor at the frequency of the A-C voltage produced by the inverter.

References Cited

UNITED STATES PATENTS

| 3,201,683 | 8/1965 | Hjermstad et al. | |
| 3,219,919 | 11/1965 | Schmidt | 321—18 XR |
| 3,281,652 | 10/1966 | Perrins | 323—47 XR |
| 3,370,223 | 2/1968 | Senetcen | 323—22 |

LEE T. HIX, *Primary Examiner.*

W. SHOOP, *Assistant Examiner.*

U.S. Cl. X.R.

321—18; 323—22, 24, 66, 76; 307—66